United States Patent
Mathew et al.

(10) Patent No.: US 11,513,911 B2
(45) Date of Patent: Nov. 29, 2022

(54) GLOBAL SNAPSHOT BACKUPS OF A DISTRIBUTED NAME SPACE

(71) Applicant: EMC IP Holding Company LLC, Hopkinton, MA (US)

(72) Inventors: George Mathew, Belmont, CA (US); Abhishek Rajimwale, San Jose, CA (US); Charles Hickey, Aptos, CA (US); Murthy V Mamidi, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 334 days.

(21) Appl. No.: 16/804,595

(22) Filed: Feb. 28, 2020

(65) Prior Publication Data
US 2021/0271561 A1    Sep. 2, 2021

(51) Int. Cl.
| | |
|---|---|
| *G06F 16/00* | (2019.01) |
| *G06F 11/14* | (2006.01) |
| *G06F 9/30* | (2018.01) |
| *G06F 16/11* | (2019.01) |
| *G06F 16/16* | (2019.01) |
| *G06F 16/22* | (2019.01) |

(52) U.S. Cl.
CPC ...... *G06F 11/1464* (2013.01); *G06F 9/30047* (2013.01); *G06F 11/1451* (2013.01); *G06F 11/1461* (2013.01); *G06F 11/1469* (2013.01); *G06F 16/128* (2019.01); *G06F 16/164* (2019.01); *G06F 16/2246* (2019.01)

(58) Field of Classification Search
CPC .. G06F 16/164; G06F 16/2246; G06F 16/128; G06F 9/30047; G06F 11/1451; G06F 11/1461; G06F 11/1469

USPC ........................................................ 707/649
See application file for complete search history.

(56) References Cited

U.S. PATENT DOCUMENTS

| | | | | |
|---|---|---|---|---|
| 8,484,259 | B1* | 7/2013 | Makkar ................ | G06F 16/907 707/769 |
| 9,632,892 | B1* | 4/2017 | Sledz .................... | G06F 16/182 |
| 9,898,369 | B1* | 2/2018 | Moghe ................. | G06F 16/128 |
| 9,904,480 | B1* | 2/2018 | Singh ................... | G06F 3/0641 |
| 9,904,482 | B1* | 2/2018 | Chakraborty ........ | G06F 3/0641 |
| 10,152,481 | B1* | 12/2018 | Singh ................... | G06F 16/182 |
| 10,496,611 | B1* | 12/2019 | Singh .................... | G06F 16/11 |
| 11,048,591 | B1* | 6/2021 | Mamidi .............. | G06F 16/2246 |

OTHER PUBLICATIONS

Dongwon Kang et al.; "μ-Tree: An Ordered Index Structure for NAND Flash Memory", EMSOFT '07, Sep. 30-Oct. 3, 2007, Salzburg, Austria; 10 pages.*

* cited by examiner

*Primary Examiner* — Monica M Pyo
(74) *Attorney, Agent, or Firm* — Staniford Tomita LLP

(57) ABSTRACT

Embodiments for enabling snapshot backups in a global name space of a cluster network, by representing the name space of cluster network in an MTree, storing data files organized in a B+ Tree format on one or more data nodes, storing name specific information of the data files in a B+ Tree format in a meta node, wherein a B+ Tree of the meta node accesses each corresponding B+ Tree in each of the one or more data nodes. The process takes snapshot backups of individual MTree limbs, and links the limbs of each snapshot into groups based on a cluster identifier and snapshot identifier.

14 Claims, 8 Drawing Sheets

GLOBAL SNAPSHOT BACKUPS OF A DISTRIBUTED NAME SPACE

TECHNICAL FIELD

Embodiments are generally directed to large-scale distributed backup systems, and specifically to providing snapshot backups of a distributed global name space.

BACKGROUND

Snapshot backups capture an entire instance or copy of an application, disk, or system to create a frozen image of a given file set at any given point of time. Different implementations of snapshot backups provide different levels of data capture. For example, some provide name space level snapshots, others provide block storage level point in time copies, while some others provide even individual file level versioning, and so on. Any snapshot backup implementation must first quiesce the affected file set or storage involved and stabilize the content to create the snapshot copy. In single node systems with a local name space, this step is typically manageable, however complex might be a given data storage implementation.

A distributed file system (DFS) or network file system is a file system that allows access to files from multiple hosts through a computer network, thus allowing multiple users on multiple machines to share files and storage resources. Distributed file systems have the advantage of being able to increase their capacity and capability through the incremental addition of compute and storage resources on a local area network. This is distinct from traditional file systems, such as the Linux EXT3 or Windows NTFS, that run on a single computer (or "node"), and maintain local name spaces.

While stabilizing a single storage node system for snapshot backups is relatively easy, a name space or the storage architecture that involves a distributed global name space poses greater challenges. In distributed file systems that provide a global name space where the affected name space spans multiple storage nodes, it becomes more complex to coordinate quiescing the affected limbs spread among the concerned storage nodes. In a clustered network using a distributed name space, there are thus significant challenges in taking snapshot backups across the cluster.

What is needed, therefore, is a system and method of creating a globally self-consistent point in time image of the file set to create the snapshot backup.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dell, EMC, Networker, Data Domain, and Data Domain Boost are trademarks of Dell/EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
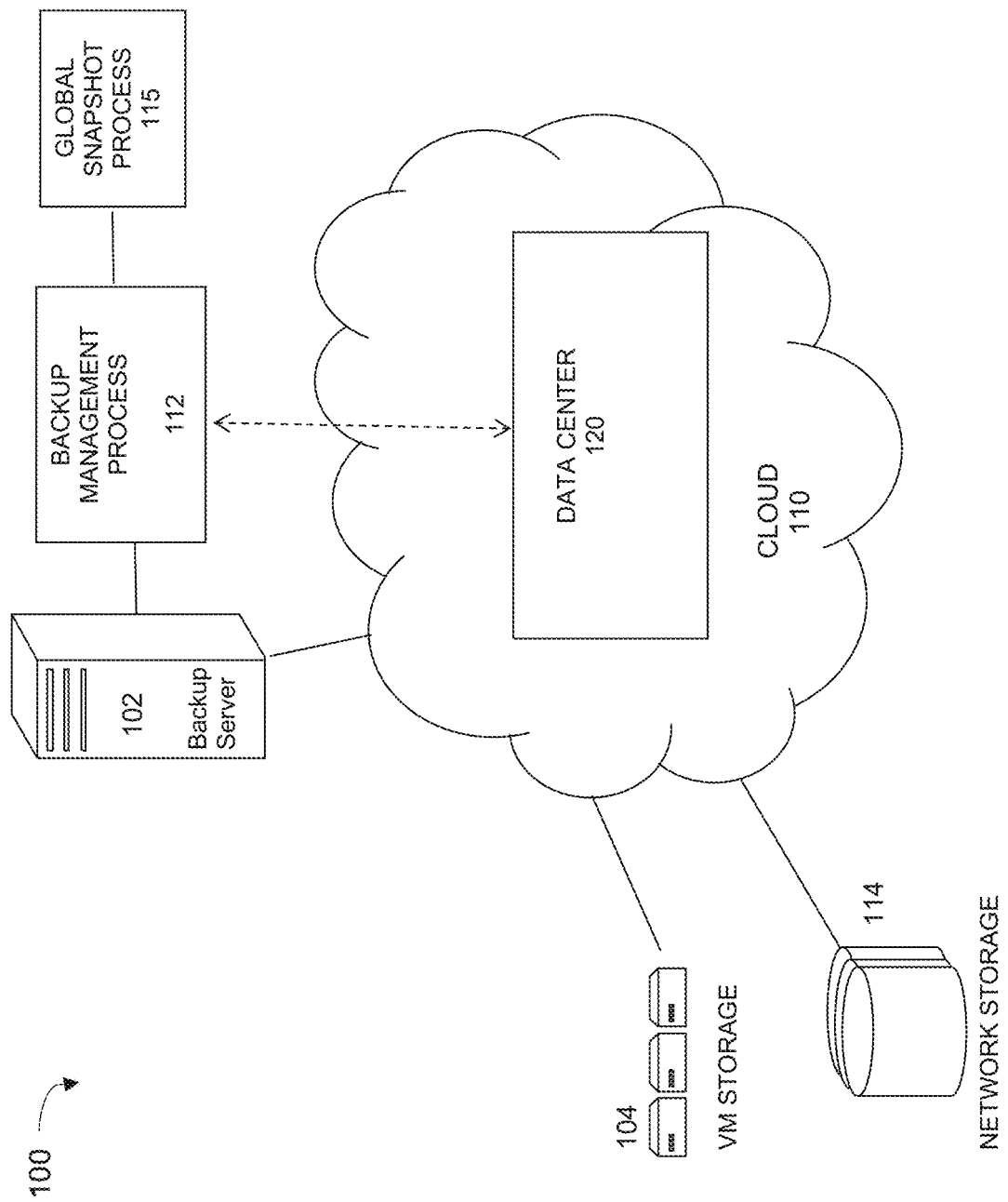
FIG. 1 illustrates a computer network that implements a global snapshot process for a distributed name space, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

FIG. 1 illustrates a computer network system implements embodiments of a global snapshot process for a distributed name space. System 100 comprises a large-scale network that includes a number of different devices, such as server or client computers 102, data center 120, storage devices 114, and other similar devices or computing resources. Other networks, sub-networks, and components may be included in system 100 including local area network (LAN) or cloud networks 110 and virtual machine (VM) storage 104 or VM clusters. These devices and network resources may be connected to a central network, such as a central or cloud computing network 110 that itself contains a number of different computing resources (e.g., computers, interface devices, and so on). FIG. 1 is intended to be an example of a representative system implementing a distributed data storage and processing system under some embodiments, and many other topographies and combinations of network elements are also possible.

For the example network environment 100 of FIG. 1, server 102 is a backup server that executes a backup management process 112 that coordinates or manages the backup of data from one or more data sources, such as other servers/clients to storage devices, such as network storage 114 and/or virtual storage devices 104, or other data centers. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, which may have attached local storage or utilize networked accessed storage devices 114. Backup targets or appliances may also be included in a data center 120 hosted in its own network (e.g., cloud) 110. Data center 120 may represent the computing resources running the information technology (IT) system of an organization or enterprise, and which are organized an interconnected in their own network, such as cloud 110. Typical data centers are relatively large-scale facilities that may be distributed around the world, but embodiments are not so limited. Any appropriate scale of intra- and inter-networked computers may be used, such as data centers within a state or region, municipality, or organization (e.g., corporation, school, University, hospital, etc.).

The network or networks of system 100 generally provide connectivity to the various systems, components, and may be implemented using protocols such as Transmission Control Protocol (TCP) and/or Internet Protocol (IP), well known in the relevant arts. In a cloud computing environment, the applications, servers and data are maintained and provided through a centralized cloud computing platform. In an embodiment, parts of system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client or server storage. The storage devices represent protection storage devices that serve to protect the system data through the backup process 112. Thus, backup process 112 causes or facilitates the backup of this data to the storage devices of the network, such as network storage 114, which may at least be partially implemented through storage device arrays, such as RAID (redundant array of independent disks) components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. The data sourced by the data source may be any appropriate data, such as database data that is part of a database management system within a data center comprising a server or servers and other clients, and the data may reside on one or more hard drives (e.g., 114) for the database(s) in a variety of formats. The backup server 102 may be a server running Networker or Avamar data protection software backing up to Data Domain protection storage, such as provided by Dell/EMC™ Corporation. However, other similar backup and storage systems are also possible.

As stated above, for the embodiment of system 100, server 102 is a backup server that executes a deduplication backup process. The deduplication backup process may also be run partially or wholly within a VM, instead or as well. Network server 102 may also be a server computer that supports part or all of the hypervisor functions. In an embodiment, the virtual machines that use or are used as part of the deduplication backup process are implemented as part of a Data Domain (DD) system, though embodiments are not so limited. Data Domain systems present a single filesystem across all storage to enable ease-of-use and simple management. This single filesystem can be completely or partially exposed as CIFS shares (for Windows), NFS mount points (for Unix/Linux), VTL for open systems and IBMi and/or through advanced integration with Data Domain Boost (for Dell/EMC Avamar, Dell/EMC Networker, Dell/EMC Greenplum, Veritas NetBackup, Veritas Backup Exec, Oracle RMAN and Quest vRanger, and other similar programs).

In a deduplication backup system utilizing virtual machines (VMs), each VM runs its own file system, such as a Data Domain Restorer (DDR) or Data Domain File System (DDFS) by Dell/EMC Corp., along with other possible applications. In the DDFS (or similar) file system, protocol-specific namespaces are presented to clients/applications for accessing the logical file system layer. Some example protocol namespaces include: Data Domain Virtual Tape Library, Data Domain Boost storage units, and CIFS/NFS fileshares.

In an embodiment, files and directories for each namespace in system 100 are stored in a B+ Tree, or other similar self-balancing tree structure. Associated with the backup management process 112 is a global snapshot process or component 115 for a distributed name space, which coordinates quiescing of affected limbs spread among different storage nodes. Although embodiments are described with reference to B+ Trees, embodiments are not so limited, and other similar data structures or binary trees to B+ Trees may be used, such as MTrees, and the like. A B+ Tree is a variant of a standard B Tree in which copies of keys are stored in the internal node, the keys and records are stored in leaves, and a leaf node may include a pointer to the next leaf to speed sequential access.

In some file systems, a binary tree is used to store the namespace of the file system in persistent storage. In general, a B+ tree is a self-balancing tree data structure that maintains sorted data and allows searches, sequential access, insertions, and deletions in logarithmic time B+ Trees are well suited for storage systems that read and write relatively large blocks of data and are used in filesystems to allow quick random access to an arbitrary block in a particular file. In a B+ Tree, a search starts from the root and recursively traverses down. For every visited non-leaf node, if the node has the key (k), it simply returns the node. Otherwise, it recurs down to the appropriate child of the node. If it reaches a leaf node and does not find k in the leaf node, it returns a NULL value. A traversal operation starts from the leftmost child, and recursively prints the leftmost child, then repeats the same process for the remaining children and keys until it ultimately recursively prints the rightmost child.

An inode (index node) is a file system data structure that describes an object, such as a file or directory. Each inode stores the attributes and disk block locations of the object's data. File-system object attributes may include metadata that encodes information such as time of last change, access, modification, owner, permission data, and so on. Directories are lists of names assigned to inodes. A directory contains an entry for itself, its parent, and each of its children.

In systems using B+ Trees, it is necessary to co-locate all the files of a given directory in the same region in the persistent store to support efficient directory listing retrievals. By doing so, the file system will be able to retrieve the directory listing of files in a directory by reading as little portion of the storage as possible, while returning the maximum amount of file system name space with fastest possible time. One mechanism is to use a B+ Tree key structure composed of the parent directory inode as the primary key and child file inode as the secondary key to construct the full key. By virtue of B+ Tree key properties, all the child file inodes are stored in a cluster in a given storage region, thus allowing the file system to retrieve the directory listing of files in a directory by reading as small a storage portion as possible, while returning the maximum amount of file system name space with fastest possible time.

Each file inode is thus stored in the B+ Tree as a data blob using the parent directory inode number and the child file inode number as the key. Such a data structure may be denoted: "<parent_inode:child_inode>". This key is used to create a file handle that is exposed to client devices. For data integrity, it is important that file handles remain immutable so that files can always be located during their lifetimes.

For the example embodiment of FIG. 1, the data storage system is a Data Domain system. In the Data Domain Operating System filesystem, protocol-specific namespaces are presented to clients/applications for accessing the logical filesystem layer. The files and directories in each B+ Tree all reference the same pool of unique segments, called a collection, which is made up of log-structured containers that organize the segments on disk to optimize throughput and deduplication effectiveness. Within a Data Domain system, there are several levels of logical data abstraction above the physical disk storage.

Figure 2:
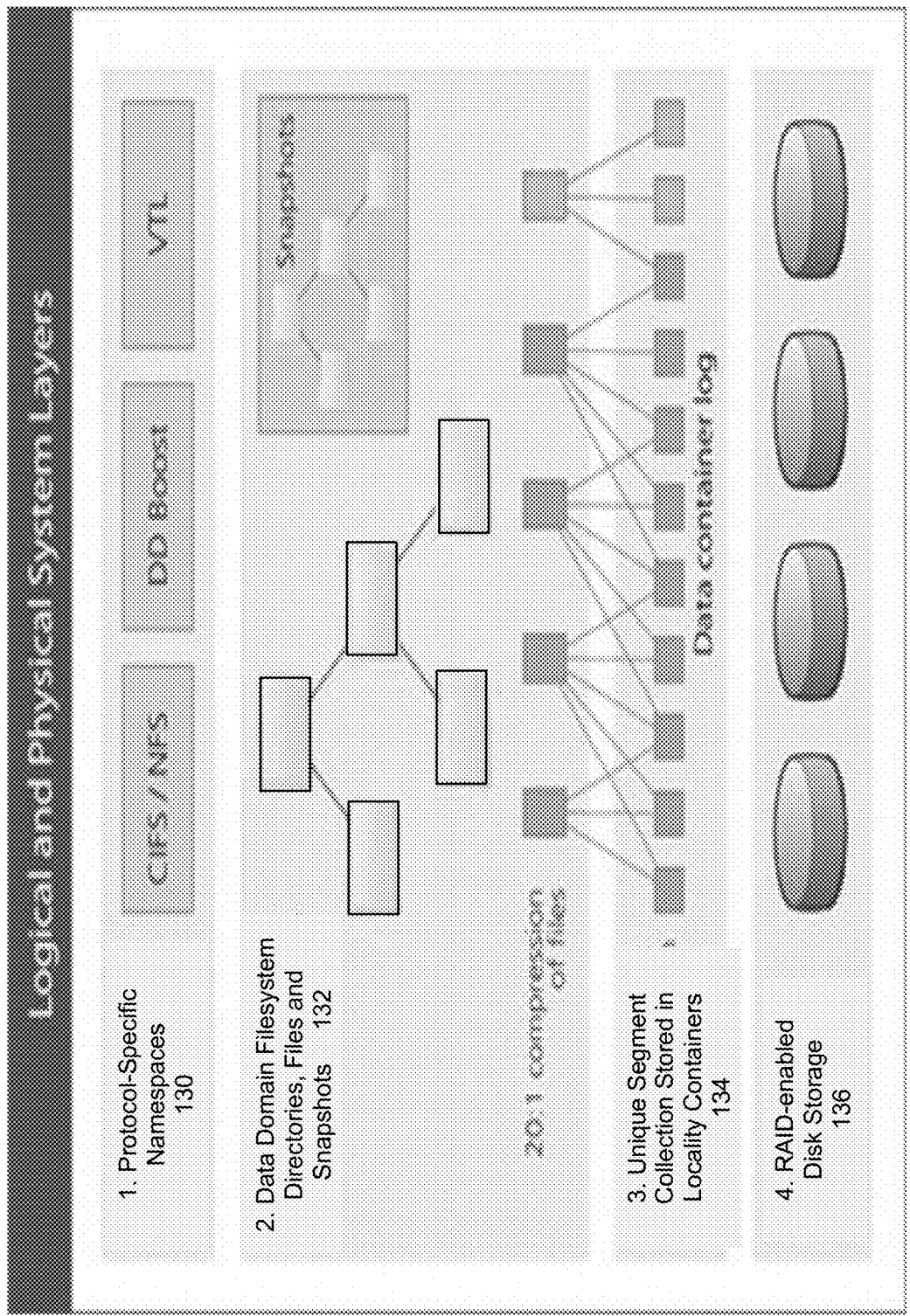
FIG. 2 levels of data abstraction in a Data Domain system including MTrees that implement a global snapshot process for a distributed name space, under some embodiments.

FIG. 2 illustrates levels of data abstraction in a Data Domain system including tree-based data structures that implement snapshot backups for a global name space, under some embodiments. As shown in FIG. 2, the Data Domain Operating System (DDOS) filesystem comprises protocol-specific namespaces 130 that provide an external interface to applications, such as CIFS/NFS file shares (over Ethernet), virtual tape libraries (VTL) (over Fibre Channel) and DD Boost storage units (SUs). A Data Domain deployment may use any combination of these simultaneously to store and access data. The filesystem B+ Trees, directories, files and snapshots layer 132 contain the files and directories for each namespace that are stored in an B+ Trees in the DDOS filesystem. The snapshots in DDOS are logical and very space-efficient because they share the same underlying data segments. A unique segment collection 134 is stored in locality containers. The system identifies and eliminates duplicate segments within each container and then writes compressed deduplicated segments to physical disk. The RAID-enabled disk storage layer 136 comprises a collection containers layer over RAID enabled disk drive blocks to ensure data security and integrity.

Snapshots of a Global Name Space

The Data Domain File System (DDFS) supports manageable file sets called MTrees. In general, an MTree is a tree data structure similar to a B+ Tree (or R-tree), which is constructed using a metric and relies on triangle inequality for efficient range and k-nearest neighbor queries. As with other tree-based data structures, the MTree is composed of nodes and leaves. In each node there is a data object that identifies it uniquely and a pointer to a sub-tree where its children reside. Every leaf has several data objects.

An MTree is a self-contained file set and each MTree acts as a mount point for the file system. DDFS implements the persistence of the name space of an MTree as a serialized B+ Tree. Basically, a typical file can be represented by a set of records. For instance, an inode with its indirect blocks block map can be one record, dirent can be another record, name hash can be yet another record, and extended attributes in others, and so on. As may be known, a dirent is a directory entry storing the name of a corresponding file.

Figure 3:
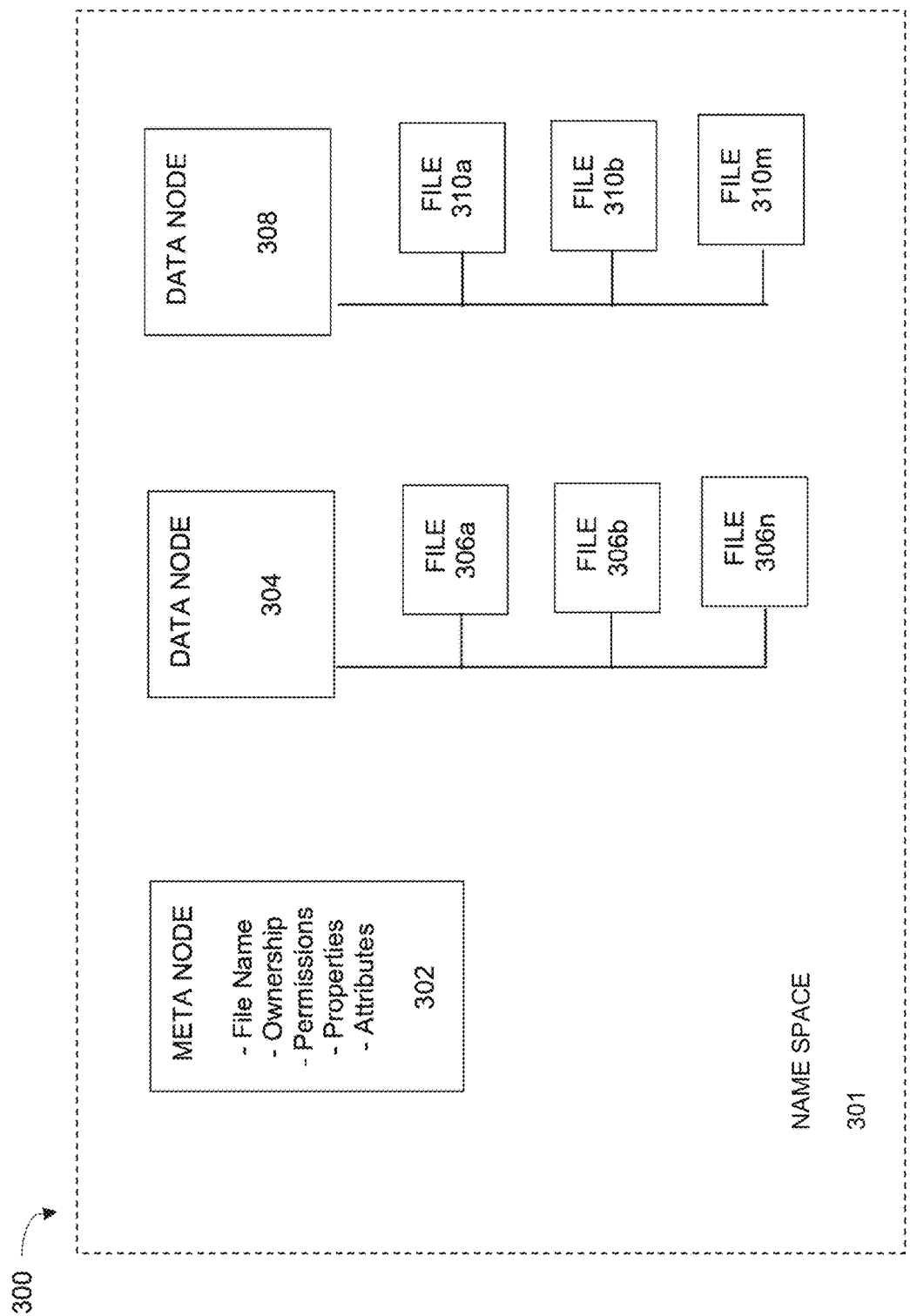
FIG. 3 illustrates separation of name space information into a meta node and one or more data nodes, under some embodiments.

In an embodiment, a global name space (GNS) implementation using MTrees is implemented by separating the name space specific information into a meta node while a data node holds the inode record holding the block map record of the indirect blocks. FIG. 3 illustrates separation of name space information into a meta node and one or more data nodes, under some embodiments. As shown in diagram 300 of FIG. 3, a name space 301 contains a meta node 302 and one or more data nodes 304 and 308. Each data node holds data in the form of files or other logical data sets. Thus, data node 304 may contain any number (N) files denoted files 306a-n, and data node 308 may contain any number (M) denoted files 310a-m. The meta node 302 contains name space information such as file names, file ownership, permissions, properties, and other attributes of the files. The metadata in meta node 302 data contains data for all of the files 306a-c and 310a-c in name space 301 for all data nodes in the name space. The diagram of FIG. 3 is provided for example only, and any number of data nodes and files may be included.

The embodiment of FIG. 3 confines the file data to a single node. Though this appears to be a limitation, it actually simplifies the global name space implementation and the garbage collection processes significantly. This process allows all name space operations like file creation, deletion, rename and so on, to be done on the meta node, while file content maintenance can be done on each data node. Thus, in a clustered network implementing a distributed name space, there may be a number of different name spaces 301, and snapshot backups can be taken of all the name spaces in an efficient manner.

Figure 4:
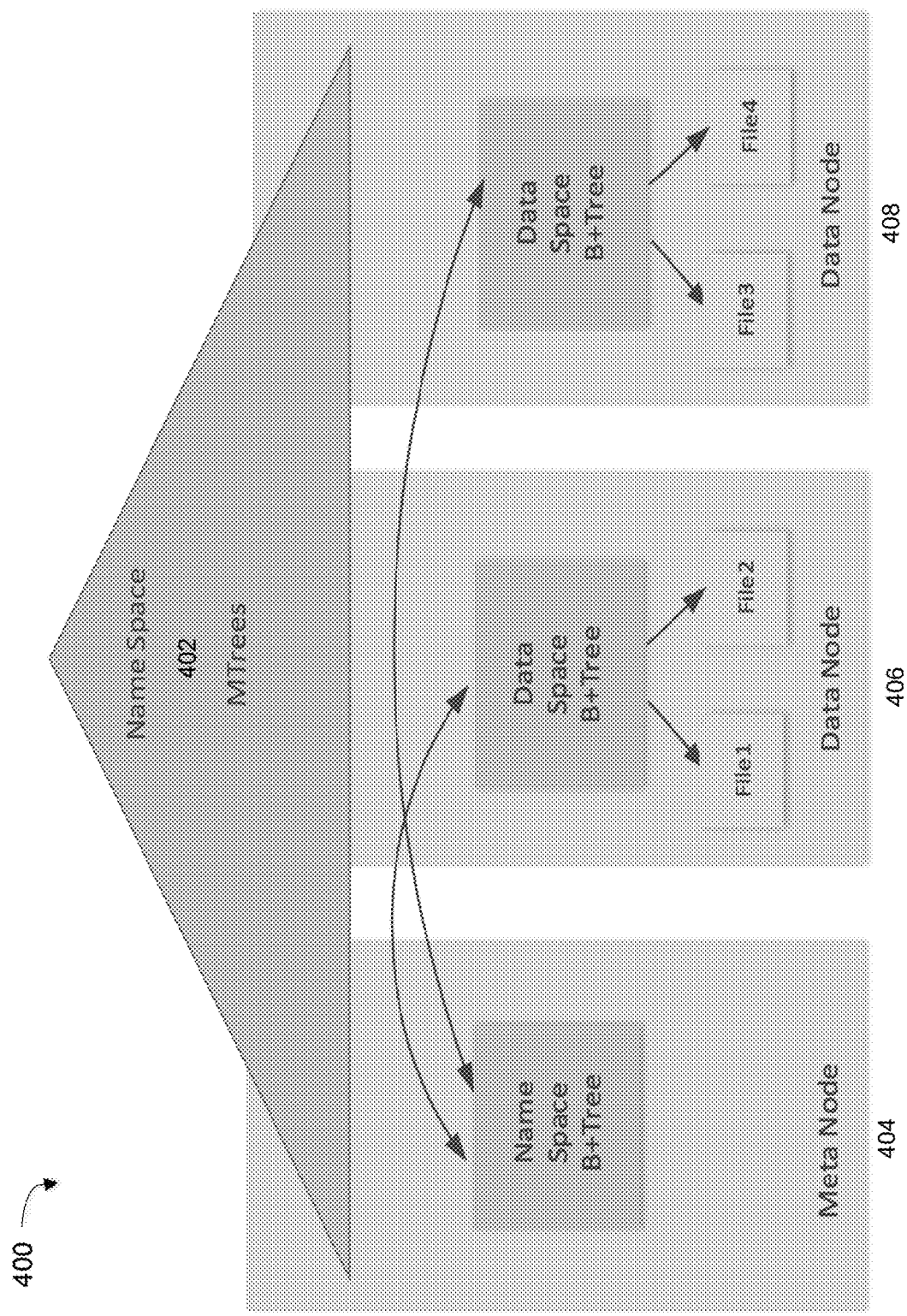
FIG. 4 illustrates a global name space with a meta node and data nodes utilizing B+ Trees, under some embodiments.

FIG. 4 illustrates a global name space with a meta node and data nodes, under some embodiments. Thus, as shown in FIG. 4, name space 402 having a number of MTrees represents example meta node 404 and data nodes 406 and 408. Each node has its own name space B+ Tree, and the meta node B+ Tree references the B+ Tree in each of the data nodes, as shown. For system 400 of FIG. 4, a global snapshot operation can be visualized as collection of snapshots of individual limbs of an MTree among the hosting nodes. A spanning MTree consists of a single "Name Space. B+ Tree" (also called a meta-MTree) and zero or more "Data Space B+ Trees" (also called shadow-MTrees) and those Data Space B+ Trees may exist on other nodes in the cluster. In FIG. 4, the Name Space B+ Tree is box 404 and its limbs are Data Space B+ Tree box 406, and Data Space B+ Tree box 408. Triangle 402 is provided as an indicator of the spanning nature of the global name space.

The individual limbs of a given snapshot are linked into a group based on a cluster unique ID and MTree specific snapshot identity. The file handles on the data name space are used to locate the files. A file handle is of the form: "<parent_inode:child_inode>," where the term "inode" is meant to mean "inode number". The content handle, as used in DDFS systems, contains the information required to find the actual data in the file on disk, and may also be referred to as a "file block map." The DDFS content handle contains the length of the file, a generation number, and a "fingerprint". The fingerprint is what is used to find the actual data in the file which is stored somewhere on disk.

The B+ Tree contains set of key-value pairs, where the key contains among other things a file handle of the format "<parent_inode:child_inode>", and the "value" is the "inode" of the file. The inode contains the file name, modification time, and a content handle, which is used to find the actual data on disk. The B+ Tree then does not contain any file data, just key-value pairs.

As stated above, the individual limbs of a given snapshot are linked into a group based on a cluster unique ID and MTree specific snapshot identity. The "cluster unique ID" is the MTree ID, which is a 32-bit number that is unique on the cluster. The "MTree specific snapshot identity" is also a 32-bit number that is unique to the cluster. It operates like the file handle, where <mtree_id>:<snapshot_id> can be used a key to find any given MTree and its snapshot. Snapshot IDs are monotonically increasing, e.g. 16, 17, 18, 19, etc. When a spanning MTree is created with one name space B+ Tree, and zero or more data space B+ Trees, they are all created with the same MTree_id. When a snapshot is taken, the snapshot exist on the nodes and all the same mtree_id:snapshot_id.

In certain cases, an additional pair of numbers is used. These comprise the "cp_id/cpg_id" pair, which is a 128-bit number and 32-bit number. This pair used to uniquely identify the node, and the place on the node, where the MTree and its snapshots live. A global snapshot then consists of a set of one or more of these 4-tuples: <cp_id:cpg_id: mtree_id:snapshot_id>, where <cp_id:cpg_id> identifies the node, and <mtree_id:snapshot_id> identifies the MTree and snapshot on that node, and the mtree_id:snapshot_id is the same on all the nodes.

As shown in FIG. 4, when a global snapshot is taken, the file management layer in the file system can implement a cluster-wide quiescing protocol by broadcasting an RPC (remote procedure call) to all the limb nodes of an MTree. The process of quiescing a node basically involves stopping all read/write activity to and from the node so that content cannot be changed. Quiescing the nodes is important to obtain consistent snapshot backups, and is part of a freeze/thaw routine in which the file system stops activity and sends data down to the disk (freeze) and the opens back up to traffic again (thaw). During the quiescing process, each node flushes their content in transit and stabilizes the content handle of all the dirty files of that MTree. The file management layer on each node then persists the file's block map inode record into the local dataspace B+ Tree. For convenience, the same may be synced into the name space B+ Tree as well, if desired. At the end of quiescing period, the name space B+ Tree will be consistent with all its data space B+ Tree limbs. The name space persistence layer can then register and store the cluster-wide identity of the given snapshot.

Figure 5:
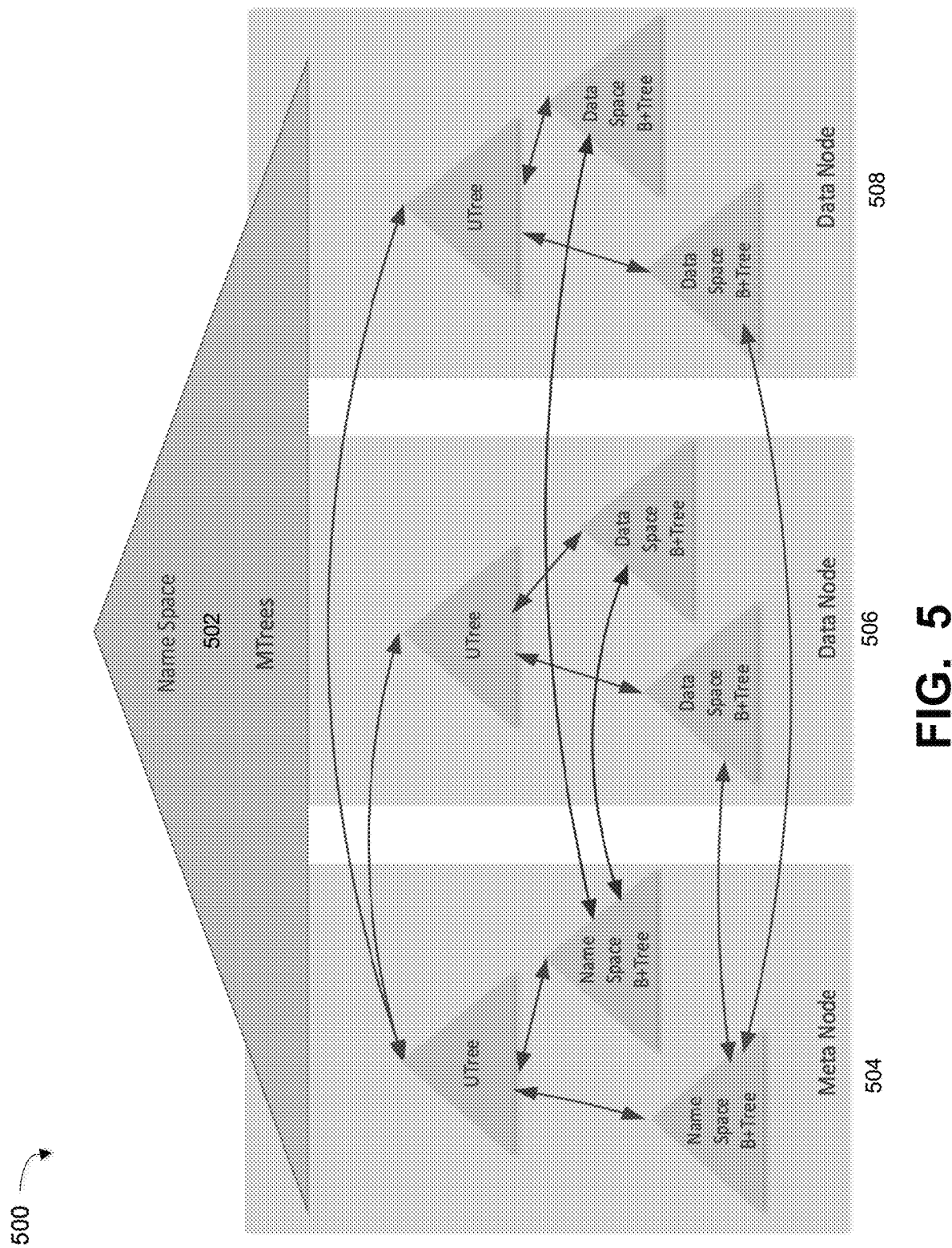
FIG. 5 illustrates a global name space with a meta node and data nodes utilizing B+ Trees and UTrees, under some embodiments.

As shown in FIG. 4, the meta and data nodes can utilize individual B+ Trees to respectively hold the metadata and data files. Alternatively, other or higher level tree structures may be used to hierarchically organize this information. Thus, as with individual B+ Trees of name space or data space that store content handles etc., there can be a next higher-level B+ Tree structure that can be constructed to house content handles of name space and data space B+ Trees themselves. FIG. 5 illustrates a global name space with a meta node and data nodes utilizing B+ Trees and UTrees as these higher level trees, under some embodiments. As shown in diagram 500, for global name space 502, the meta node 504 contains one or more name space B+ Trees that accesses respective data space trees of data nodes 506 and 508. The name space and data space B+ Trees can be treated like normal data files with their respective block maps stored in the node specific higher level B+ Tree. For the purpose of illustration, the higher level B+ Tree is represented and named as a "UTree" (Umbrella Tree) in FIG. 5. With this hierarchical B+ Tree structure, each node can be configured with the respective UTree. FIG. 5 illustrates one example of hierarchical tree structures for the meta and data nodes, and embodiments are not so limited. Other tree structures and relationships can also be used.

When a global snapshot is taken, it will be initiated from the meta node of the given MTree. Thus, meta node acts as a cluster coordinator for the MTree, and the meta node could then generate a MTree unique identifier for use as a cluster-wide snapshot identity. The process of taking the cluster snapshot can then forward that identifier to all the nodes that house the data space B+ Trees of the MTree. Thus, each node can then store the point in time copy of data space B+ Tree into its local parent UTree. Since the snapshot backup is just a frozen view of a file set, in the distributed name space, it is simply a collection of such point in time copies of set of name space and data space B+ Trees. So, for a given snapshot, there will be a correlated set of a one name space B+ Tree and a set of the corresponding data space B+ Trees, knit together by the snapshot identifier. In general, snapshot backups are taken at regular periodic time intervals by the backup server 102. These snapshots are identified by a monotonically increasing numerical value, each of which corresponds to a specific correlated B+ Tree.

The overall process thus store the content handles of files on each separate node in respective B+ Trees. During normal operation, i.e., not when a snapshot is taking place, external users can be writing to files directly to the data nodes, which changes the content handles in the data-space B+ Trees, while file creations are changing file content handles on the name-space B+ Trees. During a snapshot, all that activity is stopped, and the content handles for the files data-nodes are "synced" back on to the name-space B+ Tree. The name of a file is kept on the name-space 9+ Tree, and its data is kept on the data-space B+ Tree, e info on the file (e.g., the content handle) kept in both places, but allowed it to get out of sync during normal operations performance s maximized. During a snapshot, all the file checksums between the name space B+ Trees and data space B+ Trees are synchronized.

The process then generates the content handle of respective B+ Trees of respective nodes. During a quiescing process, the content handles are stabilized into respective UTrees. The process then correlates these based on the same snapshot ID. The B+ Tree is essentially just a file, and its file handle is the <mtree_id>:<snapshot_id> which is part of a name value pair in the Utree B+ Tree (the top level B+ tree). A snapshot generates a new content handle for the active MTree <mtree_id>:<0> and store its previous content handle as the snapshot in the Utree.

Figure 6:
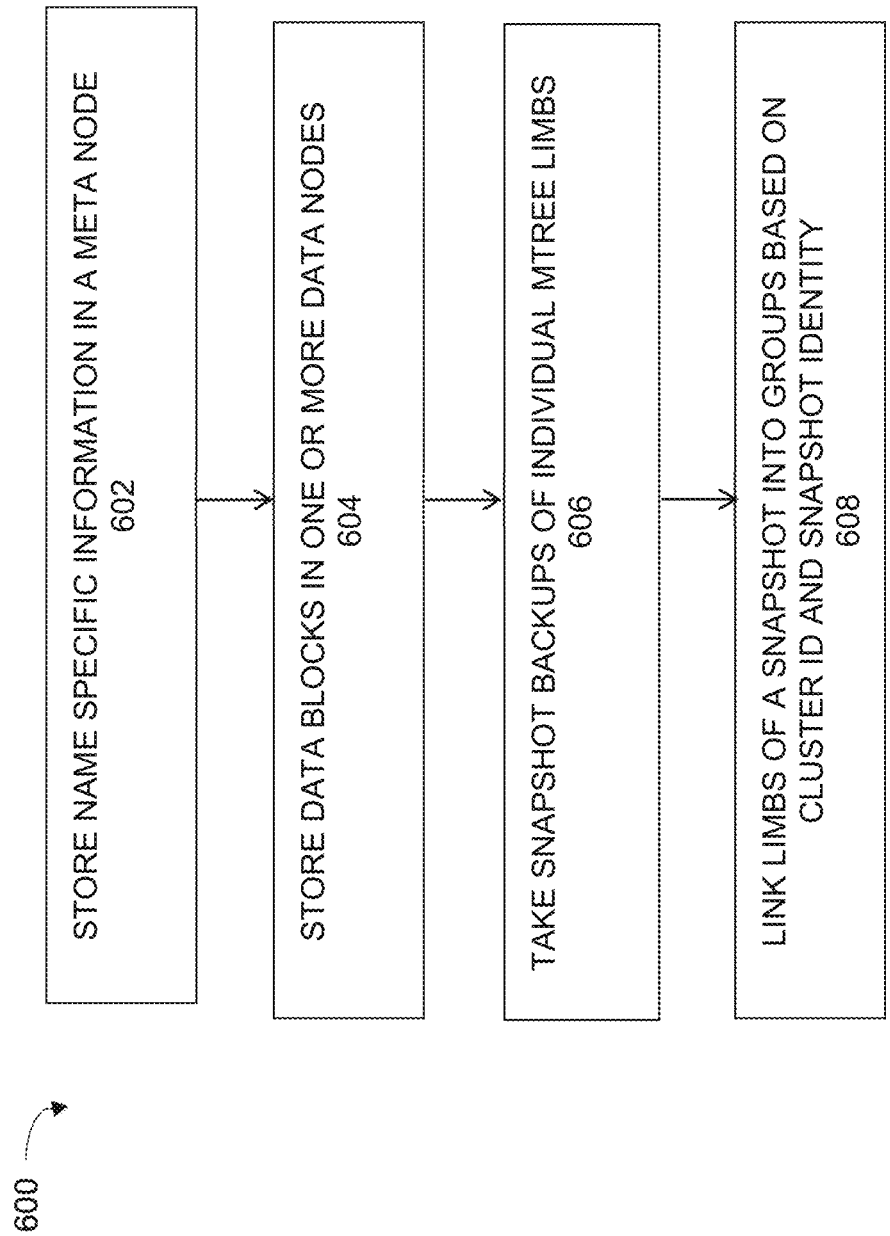
FIG. 6 is a flowchart that illustrates a process of organizing meta and data nodes in a distributed name space, under some embodiments.

FIG. 6 is a flowchart that illustrates a process of organizing meta and data nodes in a distributed name space, under some embodiments. As shown in FIG. 6, process 600 begins with storing name specific information in a meta node, 602, and storing data blocks in one or more data nodes, 604, where the B+ Tree of the meta node accesses the corresponding B+ Trees of each data node. Snapshot backups are then taken of individual MTree limbs, 606. The individual limbs of a given snapshot are linked into a group based on a cluster unique ID and MTree specific snapshot identity, 608. The global snapshot operation thus represents a collection of snapshots of individual limbs of an MTree among the hosting nodes.

Figure 7:
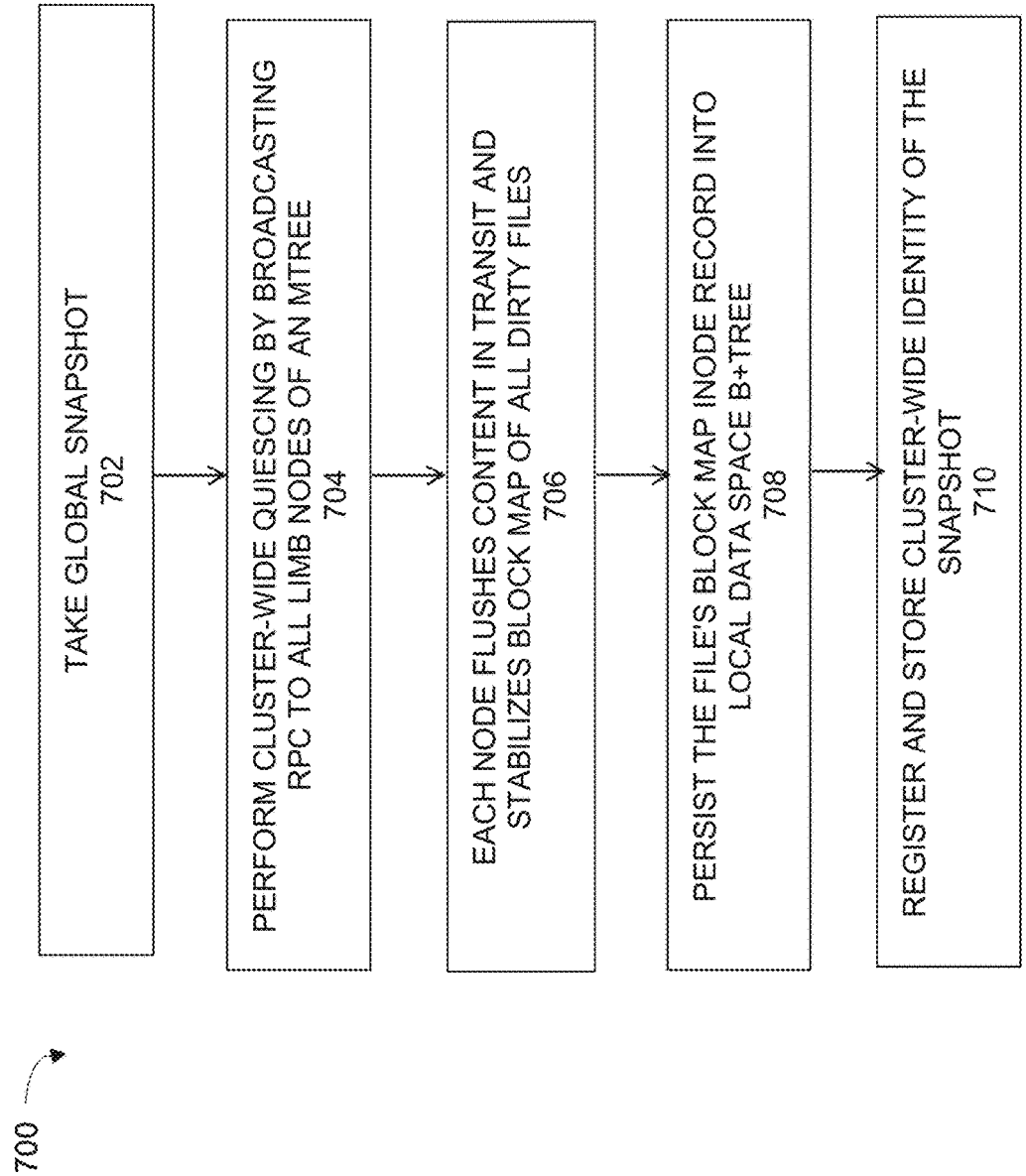
FIG. 7 is a flowchart that illustrates a process of providing snapshot backups of a distributed global name space, under some embodiments.

The snapshot obtained in process 600 is used in conjunction with a quiescing process. FIG. 7 is a flowchart of providing snapshot backups of a distributed global name space, under some embodiments. As shown in process 700 of FIG. 7, when a global snapshot is taken, 702, the file management layer in the file system implements a cluster-wide quiescing protocol by broadcasting an RPC to all the limb nodes of an MTree, 704. Each node then flushes their content in transit and stabilizes the content handles of all the dirty files of that MTree, 706. The file management layer on each node then persists the file's block map inode record into the local dataspace B+ Tree, 708. This may be synced into the name space B+ Tree as well, if desired. At the end of quiescing period, the name space B+ Tree is consistent with all its data space B+ Tree limbs. The name space persistence layer can then register and store the cluster-wide identity of the given snapshot, 710.

Embodiments thus help implement linearly scalable distributed name space and support cluster-wide, point-in-time images for data backup systems.

System Implementation

Figure 8:
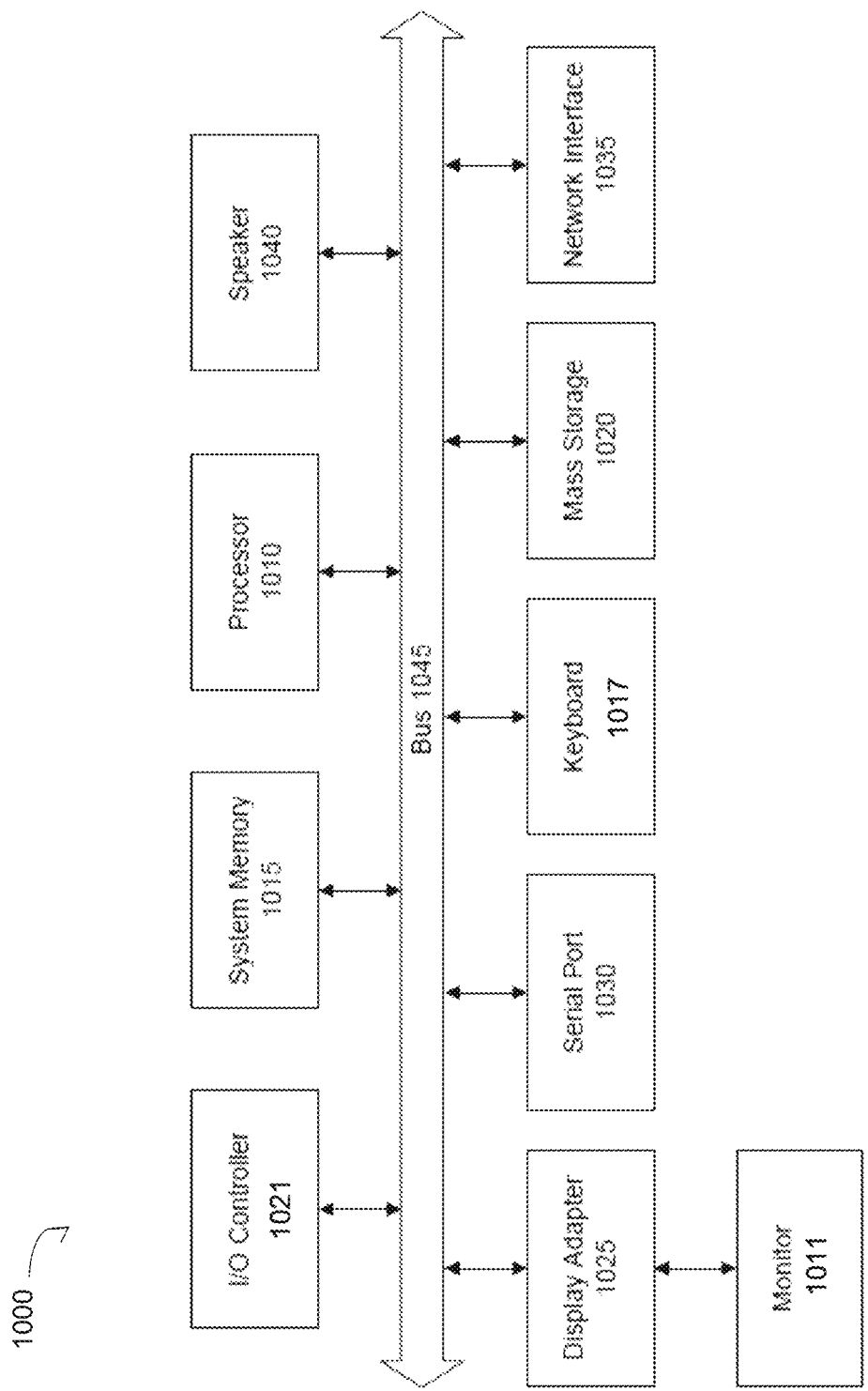
FIG. 8 is a block diagram of a computer system used to execute one or more software components of a global snapshot process for a distributed name space, under some embodiments.

FIG. 8 is a block diagram of a computer system used to execute one or more software components of providing snapshot backups of a distributed global name space under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 8 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac™ OS X, IRIX32, or IRIX64. Other operating systems may be used.

Although certain embodiments have been described and illustrated with respect to certain example network topographies and node names and configurations, it should be understood that embodiments are not so limited, and any practical network topography is possible, and node names and configurations may be used.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

Some embodiments of the invention involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although embodiments are described and illustrated with respect to certain example implementations, platforms, and applications, it should be noted that embodiments are not so limited, and any appropriate network supporting or executing any application may utilize aspects of the backup management process described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method enabling snapshot backups in a global name space of a cluster network, comprising:
    representing the name space of cluster network in an MTree;
    storing data files organized in a hierarchical tree format on one or more data nodes;
    storing name specific information of the data files in a B+ Tree format in a meta node, wherein a B+ Tree of the meta node accesses each corresponding B+ Tree in each of the one or more data nodes;
    taking snapshot backups of individual MTree limbs, each individual MTree limb representing an individual node within the cluster network;
    linking the limbs of each snapshot into groups based on a cluster ID and snapshot ID;
    forming, by the meta node, a global snapshot from the snapshot backups of the individual MTree limbs;
    broadcasting a remote procedure call to all limb nodes of the MTree to initiate a cluster-wide quiescing process;
    flushing, by each node, data content in transit and stabilizing a block map of all dirty files;
    persisting each files block map inode record into a local data space B+ Tree; and
    registering and storing a cluster-wide identity of the global snapshot.

2. The method of claim 1 wherein the name specific information comprise metadata specifying at least one of the following: file name, file ownership, permissions, file properties, and attributes.

3. The method of claim 1 wherein the meta node generates an MTree unique identifier for use as a cluster-wide snapshot identifier.

4. The method of claim 1 further comprising organizing the B+ Trees of each of the meta and data nodes into a higher level UTree to form a hierarchical tree structure.

5. The method of claim 4 further comprising configuring each node with a respective UTree.

6. The method of claim 1 wherein files in each B+ Tree all reference the same pool of unique segments made up of log-structured containers that organize the segments on disk to optimize throughput and deduplication backup effectiveness.

7. The method of claim 1 wherein the cluster network comprises a Data Domain File System (DDFS) deduplication backup system.

8. A system for enabling snapshot backups in a global name space of a cluster network, the system comprising:
    a first component representing the name space of cluster network in an MTree;
    a storage device storing data files organized in a hierarchical tree format on one or more data nodes, and storing name specific information of the data files in a B+ Tree format in a meta node, wherein a B+ Tree of the meta node accesses each corresponding B+ Tree in each of the one or more data nodes;
    a backup component taking snapshot backups of individual MTree limbs, each individual MTree limb representing an individual node within the cluster network, and linking the limbs of each snapshot into groups based on a cluster ID and snapshot ID, wherein a global snapshot is formed by the meta node from the snapshot backups of the individual MTree limbs;
    an interface component broadcasting a remote procedure call to all limb nodes of the MTree to initiate a cluster-wide quiescing process; and a second component flushing, by each node, data content in transit and stabilizing a block map of all dirty files, persisting each files block map inode record into a local data space B+ Tree, and registering and storing a cluster-wide identity of the global snapshot.

9. The system of claim 8 wherein the name specific information comprise metadata specifying at least one of the following: file name, file ownership, permissions, file properties, and attributes.

10. The system of claim 8 wherein the meta node generates an MTree unique identifier for use as a cluster-wide snapshot identifier.

11. The system of claim 8 wherein the B+ Trees of each of the meta and data nodes are organized into a higher level UTree to form a hierarchical tree structure.

12. The system of claim 11 wherein each node is configured with a respective UTree.

13. The system of claim 8 wherein the cluster network comprises a Data Domain File System (DDFS) deduplication backup system.

14. A computer program product, comprising a non-transitory computer-readable medium having a computer-readable program code embodied therein, the computer-readable program code adapted to be executed by one or more processors to implement a method for enabling snapshot backups in a global name space of a cluster network, the method comprising:

representing the name space of cluster network in an MTree;

storing data files organized in a hierarchical tree format on one or more data nodes;

storing name specific information of the data files in a B+ Tree format in a meta node, wherein a B+ Tree of the meta node accesses each corresponding B+ Tree in each of the one or more data nodes;

taking snapshot backups of individual MTree limbs, each individual MTree limb representing an individual node within the cluster network;

linking the limbs of each snapshot into groups based on a cluster ID and snapshot ID;

forming, by the meta node, a global snapshot from the snapshot backups of the individual MTree limbs;

broadcasting a remote procedure call to all limb nodes of the MTree to initiate a cluster-wide quiescing process;

flushing, by each node, data content in transit and stabilizing a block map of all dirty files;

persisting each files block map inode record into a local data space B+ Tree; and registering and storing a cluster-wide identity of the global snapshot.

* * * * *